United States Patent [19]

Kammerer et al.

[11] 4,063,140
[45] Dec. 13, 1977

[54] METHOD AND APPARATUS FOR LIMITING POSITION SERVO AUTHORITY

[75] Inventors: Leo P. Kammerer; Gordon R. Fabian; Roger D. Burns, all of Cedar Rapids, Iowa

[73] Assignee: Rockwell International Corporation, El Segundo, Calif.

[21] Appl. No.: 655,653

[22] Filed: Feb. 5, 1976

[51] Int. Cl.² ............................................. G05B 13/00
[52] U.S. Cl. ................................... 318/561; 318/565; 244/194
[58] Field of Search ..................... 318/585, 566, 561; 244/194, 195

[56] References Cited

U.S. PATENT DOCUMENTS

| 2,978,210 | 4/1961 | Larson | 318/566 X |
| 3,201,675 | 8/1965 | Curran et al. | 318/566 |
| 3,428,791 | 2/1969 | Chandos | 318/561 X |
| 3,793,574 | 2/1974 | Hamel | 318/561 |
| 3,925,640 | 12/1975 | Duggan | 318/585 X |

Primary Examiner—B. Dobeck
Attorney, Agent, or Firm—Terry M. Blackwood; Robert J. Crawford; L. Lee Humphries

[57] ABSTRACT

Method and apparatus for limiting the authority of a position servo system over an aircraft control surface. The amplitude of the energizing signal delivered to the actuator portion of the servo system is limited in accordance with a non-constant function of time.

10 Claims, 4 Drawing Figures

METHOD AND APPARATUS FOR LIMITING POSITION SERVO AUTHORITY

This invention relates to electronics and to limiting the authority of aircraft control surface actuators.

Autopilot systems, from data received from various sensors and on-board computers, compute aircraft maneuver commands and present same to appropriate position servo systems which in turn automatically position the aircraft control surfaces such as the elevators and ailerons. To avoid disastrous results in the event of autopilot malfunction, the FAA requires that regardless of the amplitude of the maneuver command delivered to the position servo system, the aircraft transient response may not exceed certain maximums. For instance, for the aircraft flying in a trimmed condition, an autopilot malfunction and a resulting severe increase (positive or negative) in elevator command signal is not permitted to subject the aircraft to a change in G's exceeding 1 G (plus or minus) within three seconds following recognition of the malfunction. Further, for the aircraft flying in a trimmed condition, an autopilot malfunction and a resulting severe increase in aileron command signal is not permitted to subject the aircraft to a roll angle change exceeding 60° (plus or minus) within three seconds following the malfunction, or 20°/sec.

To achieve such results, it is common to limit the surface-moving portion of the position servo system, i.e., the actuator, such that the control surface movement is limited. In the vernacular of the art, this is referred to as limiting the authority of the actuator. Generally such actuators are electromechanical and more particularly are servomotors. Conventionally the actuator authority is limited by limiting the amount of torque output that the servomotor can deliver and this is accomplished by either a mechanical slip clutch that slips when the maximum torque is exceeded or by electronic means where the torque producing motor input current, and thus the motor torque output, is prevented from exceeding a single constant maximum. Such authority limiting meets the FAA certification requirements but causes performance problems at different flight conditions where more torque is required to hold the aircraft path, such as with configuration changes (e.g., lowering the flaps or gear, etc.).

Other approaches have included torque programming or disengaging as a function of G's or pitch rate. Such solutions are generally not totally satisfactory. For instance the aircraft can respond too quickly and exceed the certification limits before corrective action may be taken. Furthermore, nuisance disconnects can occur in turbulence.

In accordance with the present invention, a novel authority limiting method and apparatus features the provision initially of adequate but not excessive torque upon predetermined maneuver command changes, and the provision of additional torque thereafter. These and other features, objects and advantages of the invention will become more apparent upon reference to the following specification, claims, and appended drawings in which:

Figure 1:
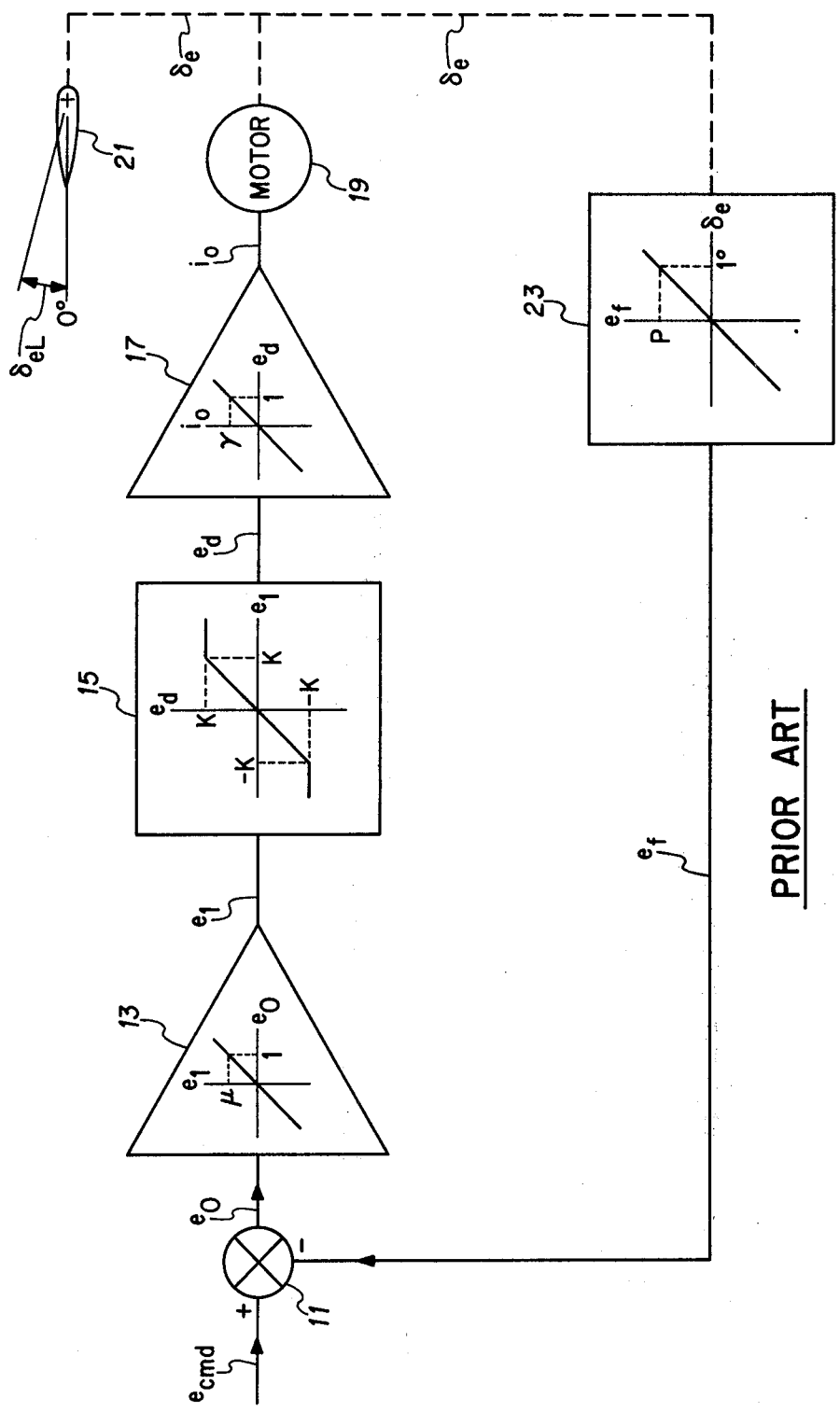
FIG. 1 is a block circuit diagram representing a typical prior art apparatus for limiting actuator authority.

FIG. 1 represents the above mentioned conventional approach to authority limiting wherein a time invariant current limit restricts the actuator input current and thus the actuator output torque and the control surface movement. Insofar as the effect had on the aircraft control surface, FIG. 1 is the electronic analogy to a mechanical slip clutch. More particularly, an autopilot maneuver command signal $e_{cmd}$, along with a position feedback signal $e_f$, enter summing means 11 at, respectively, the noninverting and inverting inputs. The summing means output $e_0$ (which is $e_{cmd}-e_f$) is input to high gain amplifier 13 and exits therefrom as $\mu e_0$, or $e_1$, which in turn is input to limiter 15. The transfer characteristic of limiter 15 wherein $e_d$ and $e_1$ are, respectively, the limiter output and input, may be described as follows:

$$e_d = e_1, \text{ for } -K \leq e_1 \leq +K$$

$$e_d = K, \text{ for } +K < e_1$$

$$e_d = -K, \text{ for } e_1 < -K.$$

The limiter output $e_d$ is input to power amplifier 17 which in turn acts as a current source to provide an output current $i_o$ which is directly proportional to $e_d$. More particularly, $i_o = \gamma \cdot e_d = \gamma e_d$. Amplifier 17 output current $i_o$ is input to DC servo motor 19 and produces torque at the motor output shaft. The motor, having its output shaft appropriately mechanically coupled (as represented by the dashed lines) to elevator 21, produces elevator deflection $\delta_e$. For predetermined load conditions the relationship between $\delta_e$ and $i_o$ is substantially one of direct proportionality; i.e., $\delta_e = Mi_o$ where M is a predetermined constant. To close the loop, the motor shaft is also mechanically coupled to position feedback generator 23 which produces the feedback signal $e_f$. Feedback signal generator 23 is typically a tachometer generator followed by an integrator and provides as its output (i.e., $e_f$) a signal which is proportional to, and indicative of, elevator deflection $\delta_e$. More particularly, $e_f = P\delta_e$ where P is a gain factor in volts per degree.

(In the drawings the aircraft control surface is assumed to be the elevator. However, this is merely to simplify descriptive references thereto, the principles of limiting of course being the same for the other control surfaces such as the ailerons and rudder.)

Figure 2:
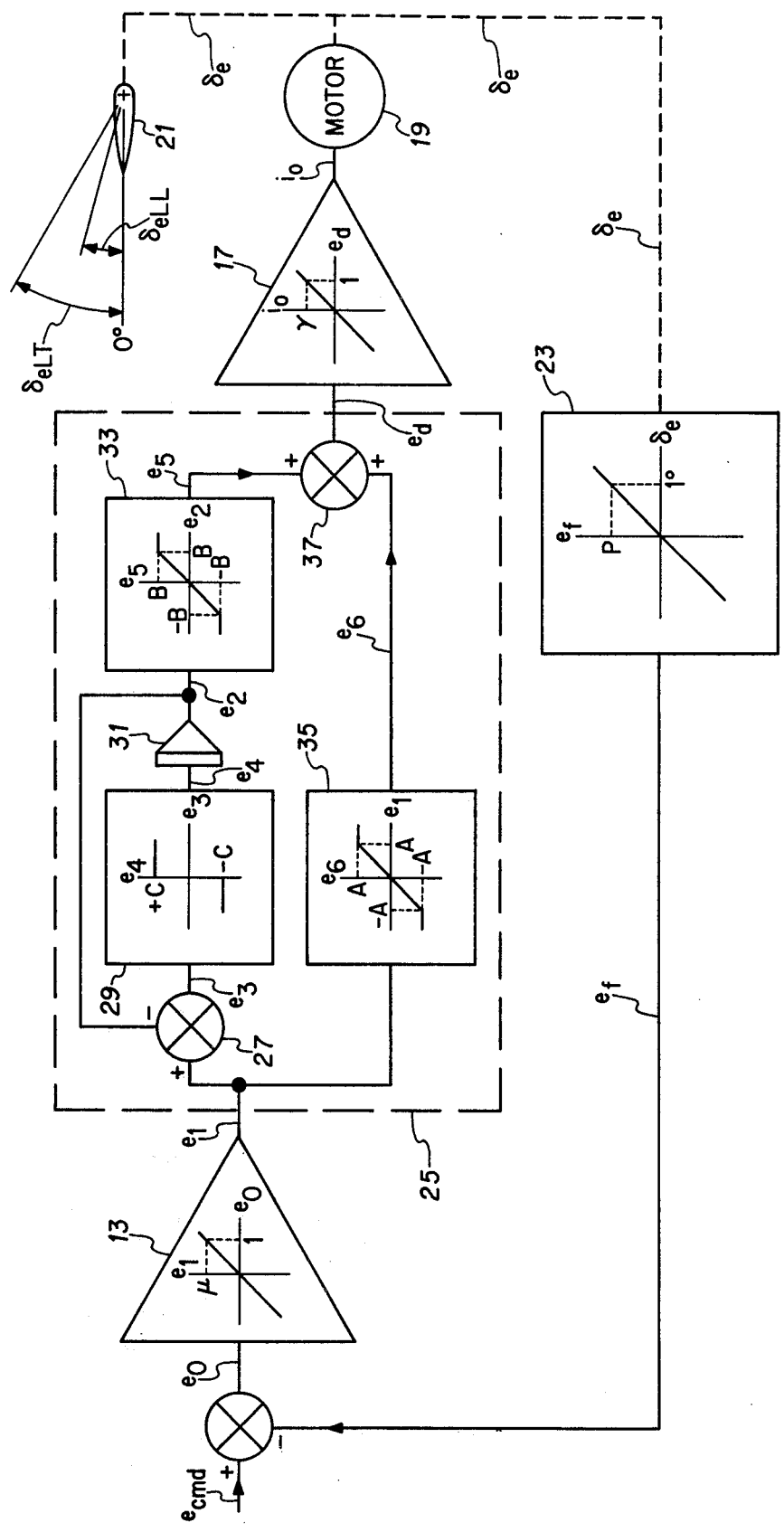
FIG. 2 is a block circuit diagram illustrating an embodiment of the inventive authority limiting apparatus.

Turning now to FIG. 2, the inventive embodiment there shown is seen to differ from the FIG. 1 apparatus by the manner and means for transforming the amplified position error signal $e_1$ into drive voltage $e_d$. More particularly, items 15 and 25 in FIGS. 1 and 2 respectively are different and otherwise the two apparatuses have the same system components and component interconnections. Thus for simplification and where possible, notation employed in FIG. 2 is the same as employed at analogous locations in FIG. 1. It should here also be pointed out, although it will become apparent hereinbelow, that for identical $e_{cmd}$ inputs to both FIGS. 1 and 2, the internal responses $e_0$, $e_1$, $e_d$, $i_o$, $\delta_e$, and $e_f$ for FIG. 2 are unlike their FIG. 1 counterparts. Moreover, in view of the similarities and the above description of FIG. 1, only the FIG. 2 differences need be stressed.

Accordingly, for the FIG. 2 apparatus, $e_1$ is input to both of the paralleled upper and lower paths of item 25. In the upper path, $e_1$ enters summing means 27 at the noninverting input and a feedback signal $e_2$ enters the same summing means at the inverting input. The output $e_3$ of summing means 27 (i.e., $e_1 - e_2$) is input to item 29, a type of comparator whose transfer characteristic may be described as follows:

$$e_4 = +C, \text{ for } e_3 > 0.$$

$$e_4 = -C, \text{ for } e_3 > 0.$$

Item 29 output $e_4$ is input to integrator 31 which provides output signal $e_2$. Signal $e_2$ is fed back to summing means 27 and also is input to limiter 33. The transfer characteristic of limiter 33 wherein $e_5$ and $e_2$ are respectively the limiter 33 output and input, may be described as follows:

$$e_5 = e_2, \text{ for } -B \leq e_2 \leq +B$$

$$e_5 = +B, \text{ for } +B < e_2$$

$$e_5 = -B, \text{ for } e_2 < -B.$$

In the lower path $e_1$ is input to limiter 35 which produces $e_6$ as its output. The transfer characteristic of limiter 35 may be described as follows:

$$e_6 = e_1, \text{ for } -A \leq e_1 \leq +A$$

$$e_6 = +A, \text{ for } +A < e_1$$

$$e_6 = -A, \text{ for } e_1 < -A$$

Both $e_5$ and $e_6$ enter summing means 37 and are summed to produce $e_d = e_5 + e_6$. Briefly, the actuator authority in the FIG. 2 apparatus increases with time from a predetermined initial degree of authority to a predetermined final degree of authority.

Briefly reviewing the operation of the FIG. 1 apparatus, it is assumed that the motor torque output TQ is a minimum of zero with the elevator 21 in a streamlined condition (i.e., with $\delta_e$ at 0° in FIG. 1). Being directly proportional to torque, $i_o$ is also zero at $\delta_e = 0°$. Consequently, since motor input current $i_o$ cannot exceed a predetermined limit $i_{oL} = \gamma \cdot K = \gamma K$, and motor torque output TQ cannot exceed a corresponding limit $TQ_L$, elevator deflection $\delta_e$ cannot move from 0° more than $\delta_{eL}$ (where $\delta_{eL}$ is the limiting or maximum possible deflection under the given load conditions) and $e_f$ cannot exceed $e_{fL} = P \cdot \delta_{eL}$. Thus for an $e_{cmd} > e_{fL}$, $e_1$ (because $\mu$ is large, i.e., typically 100-200) will continuously exceed K, and $e_4$, $i_o$, and $\delta_e$ will be driven to and held at their respective limits of K, $\gamma K$, and $\delta_{eL}$. For an $e_{cmd} < e_{fL}$, $i_o$ adjusts to a value between zero and $e_{oL}$ appropriate to hold the elevator at a deflection less than $\delta_{eL}$.

When a malfunction occurs, $e_{cmd}$ appears at the input as substantially a step function of large amplitude, and the elevator deflection $\delta_e$ almost immediately increases to $\delta_{eL}$. In such a case, the G's experienced start to build quite rapidly, and thus as earlier mentioned, $\delta_{eL}$ must be limited to a value which is objectionably small during normal operation.

For the FIG. 2 apparatus operational description, it is likewise assumed that the motor torque output TQ and the motor drive current $i_o$ are each a minimum of zero with the elevator in a streamlined condition (i.e., with $\delta_e$ at 0° in FIG. 2). Briefly, deflection $\delta_e$ may initially increase rapidly up to a first lower deflection "limit" $\delta_{eLL}$ and thereafter may increase only gradually up to a total or absolute deflection limit $\delta_{eLT}$. As before, $e_f$ is equal to $P \cdot \delta_e$, and thus at $\delta_e = \delta_{eLL}$, $e_f$ is equal to $e_{fLL} = P \cdot \delta_{eLL}$; likewise, at $\delta_e = \delta_{eLT}$, $e_f$ is equal to $e_{fLT} = P \cdot \delta_{eLT}$. Thus for $e_{cmd} < e_{fLL}$, $\delta_e$ in response thereto adjusts to a value appropriately less than $\delta_{eLL}$; for $e_{cmd}$ between $e_{fLL}$ and $e_{fLT}$, $\delta_e$ in response, adjusts to a value between $\delta_{eLL}$ and $\delta_{eLT}$; and for $e_{cmd} > e_{fLT}$, $\delta_e$ adjusts to $\delta_{eLT}$.

More particularly, for an $e_{cmd}$ step function of large amplitude, $e_d$, $i_o$, $\delta_e$ respond and increase almost immediately to values established by limiter 35 of A, $\gamma A$, and $\delta_{eLL}$ respectively. Integrator 31 then permits further increases in $e_d$ beyond A but only according to a ramp function whose slope is C. Similar linear rate increases in $i_o$ and $\delta_e$ are permitted beyond $\delta A$ and $\delta_{eLL}$. However, since limiter 33 in FIG. 2 does not permit $e_5$ to exceed B, the absolute limit or maximum of $e_d$ is (A+B), $i_o$ is absolutely limited at $i_{oLT} = \gamma(A+B)$, and $\delta_e$ is absolutely limited at $\delta_{eLT}$.

More mathematically expressed, for $$e_{cmd} = 0 \text{ for } t < t_0$$

$$e_{cmd} = E \text{ for } t > t_0;$$

where $E > e_{fLT}$, $e_d$ may be closely approximated by $$e_d = 0, \text{ for } t < t_0$$

$$e_d = A + C(t - t_0), \text{ for } t_0 < t < (t_0 + \tau)$$

$$e_d = A + B, \text{ for } t > (t_0 + \tau)$$

where $\tau$ is the time required for $e_2$ to increase from zero to the limit B. Since the relationships of $i_o$ and $\delta_e$ to $e_d$ are substantially ones of direct proportionality, the $i_o$ and $\delta_e$ response characteristics are substantially similar to that of $e_d$. Of course, as in the FIG. 1 apparatus, mechanical response characteristics will result in some smoothing or integration of the $\delta_e$ response.

It should now be apparent that for $e_{cmd}$ step functions whose amplitude is between $e_{fLL}$ and $e_{fLT}$, $\delta_e$ will rapidly increase to $\delta_{eLL}$, will then increase according to a ramp function to a value between $\delta_{eLL}$ and $\delta_{eLT}$, and will there settle out and remain constant. For an $e_{cmd}$ step function whose amplitude is less than $e_{fLL}$, $\delta_e$, $i_o$, $e_d$, $e_f$, and $e_0$ respond very much like their counterparts in FIG. 1, and $\delta_e$ will rapidly increase to and stop at a value appropriately less than $\delta_{eLL}$.

Generally speaking, the more gradual change in deflection $\delta_e$ provided by the FIG. 2 apparatus results in a more gradual buildup of G's in the event a malfunction occurs. Thus, assuming identical aircraft and flight conditions, the value of the FIG. 2 $\delta_{eLT}$ may be made significantly greater than the value of the FIG. 1 $\delta_{eL}$ without causing the aircraft response following a malfunction to exceed FAA limits. In other words, the FIG. 2 apparatus permits a substantial increase in maximum actuator authority and, simultaneously, compliance with FAA requirements.

To best utilize the features of the FIG. 2 apparatus, the values for A, B, and C should be determined experimentally in the particular aircraft in which the apparatus is to be employed. If item 25 of a FIG. 2 apparatus replaces item 15 of a FIG. 1 apparatus, and if the value of K for FIG. 1 is known, "safe" choices for A and C are values thereof which cause $A + C(t - t_0)$ to be equal to K at $t = 3$ seconds. However, since the G's incurred are somewhat dependent on the time averaged elevator deflection, the value of $A + C(t - t_0)$ may, depending on the particular aircraft, be permitted to exceed K at some time $t$ less than three seconds without causing the craft to exceed the FAA limits. Moreover, there are an infinite number of combinations of values of A and C which will satisfy even the expression $A+C(3-t_0) = K$.

Assuming the value of K is known, the selected value of A should be somewhat less than the K value, and from past experience, it has been found that a value of A of approximately 0.5K is a good or satisfactory choice for many applications. A good value for C is best selected, however, from in-flight experimentation. The value of B is selected to absolutely limit, in accordance with the sum (A+B), the force required by the pilot to overpower the servo.

Figure 3:
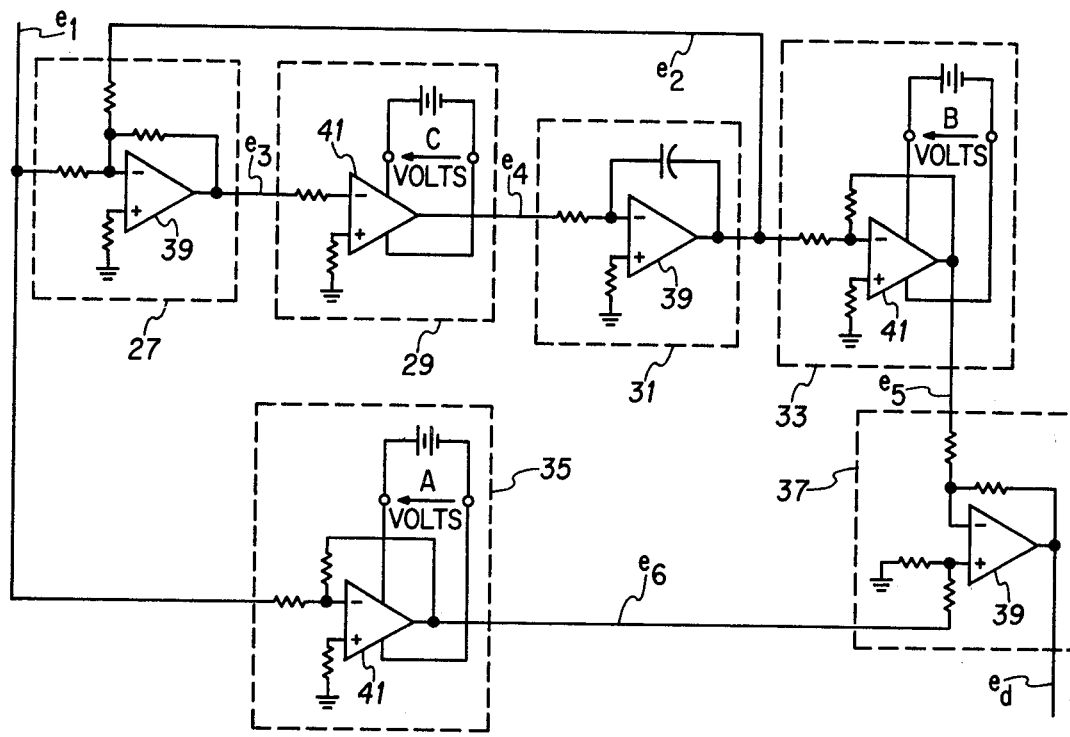
FIG. 3 is a schematic diagram of a portion of the FIG. 2 apparatus.

In implementing this novel approach to authority limiting various op-amp circuits are presently employed. FIG. 3 shows such an implementation and since the designators used in FIG. 2 are also employed in FIG. 3, little additional explanation of FIG. 3 is required. It should be noted that items 39 in FIG. 3 are operational differential input amplifiers, and items 41 are each an operational amplifier whose output saturation voltage equals the amplifier power supply voltage. The remaining FIG. 3 components are obvious to one skilled in the art.

Figure 4:
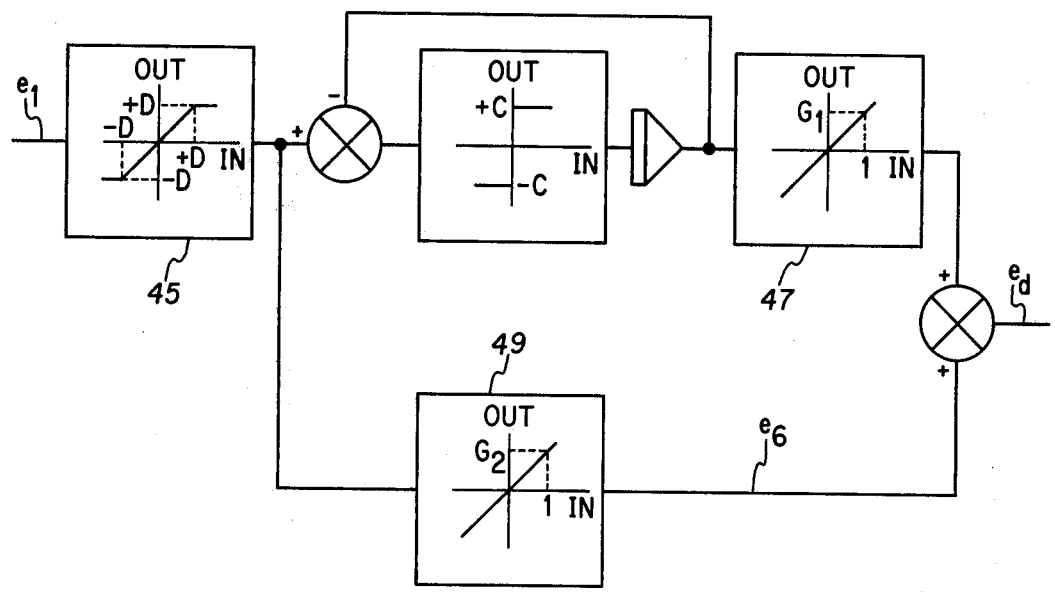
FIG. 4 is a block circuit diagram of a functional equivalent of a part of the FIG. 2 apparatus.

A functionally equivalent circuit to item 25 of FIG. 2 is shown in FIG. 4. The FIG. 4 circuit is advantageous in that only one limiter circuit 45 is required instead of the two limiter circuits 33 and 35 in FIG. 2. Items 47 and 49 provide constant gain factors $G_1$ and $G_2$ respectively, and limiter 45 is identical to limiters 33 and 35 in FIG. 2 except that the limit of 45 is set to D instead of A or B. $G_1$, $G_2$ and D are selected such that $G_1 \cdot D = B$ and $G_2 \cdot D = A$. Thus depending on the value of D, both $G_1$ and $G_2$ may be less than one, and 47 and 49 can simply be attenuators. The other components are apparent in view of the description of the FIG. 2 apparatus.

For the FIGS. 2 and 4 type of apparatus, it should now be apparent that when A is relatively low, the authority is relatively limited at first but additional authority becomes available with relatively little delay. Conversely, when A is relatively high, the authority is relatively high at first but additional authority becomes available with relatively greater delay. To increase the "near-real-time" authority and also reduce the time in which additional "delayed" authority becomes available, $e_5$ in FIGS. 2 and 4 may be made to increase according to a nonlinear function instead of the linear ramp function as heretofore described. One way to provide this is to add a second integrator following integrator 31 such that the integrator output is proportional to $t^2$ instead of $t$; A and C values may then be adjusted accordingly. (Also, depending upon the actual hardware, an inverter may be needed to assure proper signal polarity.) More particularly, when $e_{cmd}$ is a step function of large amplitude, adding a second integrator causes $e_d$ to be of the general form $$e_d = A + C(t-t_0)^2$$

so long as $$e_d < (A+B).$$

Other nonlinear functions may be more appropriate for some applications, especially where complexity and cost of hardware is not a restriction. For instance, for some applications it may be desirable to have a substantially piecewise linear $e_d$ in which $e_d$ is approximately equal to k for the first three seconds, and thereafter rises rapidly to and remains at the absolute limit. Such an $e_d$ could be generated by replacing summing means 37 in FIG. 2 with an appropriately controlled SPDT switch, increasing A so as to equal K, and (since $e_5$ and $e_6$ are no longer "summed") choosing C so that $e_5$ equals K at three seconds, and increasing B such that the new absolute authority limit is the same as the old absolute authority limit. An appropriate switch could be one which received $e_5$ and $e_6$ as input and provided as its output the one of $e_5$ or $e_6$ having the greatest absolute value, regardless of the polarity of this input. A comparator controlled SPDT transistor switch, wherein the comparator inputs are preconditioned by absolute value circuits to be $|e_5|$ and $|e_6|$, may be employed.

A further advantageous feature of the novel apparatus described hereinabove, but not required to meet FAA restrictions, may be seen by again returning to FIG. 2. Therefrom it is seen that $e_2$ will start to increase from a zero value as soon as $e_1$ becomes greater than zero, and moreover, as long as $e_1$ is not equal to zero, that $e_2$ will continue to increase until it is equal to $e_1$ and will then level off and remain at this value of $e_2$ where $e_2 = e_1$. Briefly then, for situations where $e_d$ is driven to and sustained at a constant value less than the smaller one of 2A or (A+B), the $e_5$ portion of $e_d$ will eventually increase by some amount and the $e_6$ portion will eventually decrease by the same amount. Consequently, the upper path of 25 tends to partially "take over" the drive function and permits limiter 35 to become rebiased more toward zero.

Using a specific example to illustrate, assume that B $>$ A, and also that an $e_{cmd}$ step function appropriate to drive $\delta_e$ to approximately $1.5\delta_{eLL}$ has appeared at the input. In response thereto, $e_d$ rises almost immediately to A and then increases according to the ramp of slope C until becoming, at some time $t_R$, approximately equal to 1.5A. After $t_R$, $e_d$ settles out and remains at approximately 1.5A so long as the $e_{cmd}$ input remains constant. However, since the lower path of 25 responds more rapidly than the upper path of 25, $e_6$ at time $t_R$ is still approximately equal to A and $e_5$ is approximately equal to 0.5A. Also, $e_1$ is approximately equal to A. However, since $e_2$ and $e_1$ are scaled one-to-one at the summing means 27, $e_1$ and $e_2$ will continue to decrease and increase respectively until $e_2$ is equal to $e_1$. Thus, although $e_d$ remains substantially constant at approximately 1.5A after $t_R$, $e_1$ and $e_2$ decrease and increase respectively thereafter and each stops and settles out at approximately 0.75A. The significance of the above may be seen by assuming that after $\delta_e$ has reached its final position of approximately $1.5\delta_{eLL}$, a large negative $e_{cmd}$ appears at the input. This will cause $e_6$ to change almost immediately to $-A$, but because $e_6$ had settled out at less than A, will not cause $\delta_e$ to rapidly change by an amount $2\delta_{eLL}$. Instead, $\delta_e$ will rapidly change by about $1.75\delta_{eLL}$ from the existing value of about $1.5\delta_{eLL}$ to about $-0.25\ \delta_{eLL}$.

By causing $e_6$ to decrease even more toward zero, the above feature may be further enhanced so that for existing, non-streamlined elevator positions, near-real-time maximum deflection changes may be restricted to values even closer to $\delta_{eLL}$. Causing further reduction in $e_6$ may be accomplished by adding to the FIG. 2 apparatus a voltage divider or other attenuator or "scaler" in the feedback path between the integrator output and the summing means 27 negative polarity input. If such attenuator delivers to 27 an $e_{2n}$ which is about $\frac{1}{3}e_2$, for example, $e_1$ and $e_2$ will respectively continue to decrease and increase until $e_2$ is equal to $3e_1$, and thus $e_6$ (assuming that $e_2$ has not exceeded B) will settle out closer to zero than in the above example.

It should now be apparent that if not absolute limiting of torque is desired, limiter 33 in FIG. 2 may be omitted entirely (i.e., shorted around) so that $e_2$ and $e_5$ are always the same. Additionally, equivalent absolute limiting may be achieved by relocating limiter 33 from its FIG. 2 position to a "new" position between summing means 37 and power amp 17, and changing the value of B so as to equal the old value of B plus the value of A. Moreover, when using large values of attenuation in the feedback path from integrator 31 to summing means 27 as above described, this "new" location of limiter 33 can be advantageous in that $e_5$ is no longer limited; however, the sum $(e_5 + e_6)$ is still limited.

Thus, while various embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. For use in a closed loop position servo system having input control signal $S_I$, feedback signal $S_p$, a signal $S_C$ indicative of a comparison between $S_I$ and $S_p$, and an electromechanical actuator driven by an energizing signal $S_E$, apparatus for limiting the authority of said actuator and having $S_C$ as input and providing $S_E$ as output, said apparatus comprising (i) first circuit means for providing a first component of $S_E$ wherein said first component is limited to a first predetermined constant value, (ii) second circuit means for providing a second component of $S_E$ wherein said second component is permitted to increase with time at least up to a second predetermined constant value, and (iii) third circuit means for combining said first and second components of $S_E$.

2. Apparatus as defined in claim 1 including fourth circuit means for limiting $S_E$ to an absolute maximum predetermined constant value.

3. Apparatus as defined in claim 2 wherein said second circuit means comprises a closed loop circuit means for generating a signal $S_{INT}$ including (a) combinatorial means receiving a signal proportional to $S_{INT}$ and a second signal which is a function of $S_C$, (b) comparator means receiving the combinatorial means output, and (c) integrator means receiving the comparator means output and providing $S_{INT}$ therefrom.

4. Apparatus for positioning an aircraft control surface in closed loop servo fashion in accordance with an input control signal $S_I$ comprising:

electromechanical actuator means for moving said aircraft control surface;

position feedback means for providing a feedback signal $S_p$ indicative of the position of said control surface;

means for supplying a signal $S_C$ indicative of a comparison between $S_I$ and $S_p$; and actuator authority limiting means for converting $S_C$ into an actuator energizing signal such that for a predetermined step in $S_I$ occurring at a time $t_0$, (i) the torque output TQ of said actuator cannot exceed, for time less than $(t_0 + \Delta T)$ where $\Delta T$ is a predetermined time interval, a predetermined value $TQ_1$, and (ii) for time greater than $(t_0 + \Delta T)$, TQ can exceed $TQ_1$.

5. Apparatus as defined in claim 4 wherein said actuator authority limiting means further includes means for limiting TQ to an absolute maximum value of $TQ_2$, where $TQ_2 > TQ_1$.

6. In a position servo system of the type including electromechanical actuator means driven by an energizing signal $S_E$, and means for developing from input and feedback signals a signal $S_C$ indicative of a comparison therebetween, improved circuit means receiving $S_C$ and providing $S_E$ therefrom comprising means for preventing the amplitude of $S_E$ from exceeding a limit which, in response to a predetermined input signal, varies in accordance with a predetermined function of time.

7. Apparatus as defined in claim 6 wherein said limit increases, at least up to a predetermined maximum, in accordance with said predetermined function of time.

8. In a position servo system having electromechanical actuator means driven by an energizing signal $S_E$, the method of limiting torque output of the electromechanical actuator comprising initially preventing $S_E$ from exceeding a first predetermined constant maximum and thereafter preventing $S_E$ from exceeding a maximum which increases with time from said first constant maximum to a second predetermined constant maximum.

9. In an aircraft wherein a control surface is positioned by an actuator in accordance with a command, the method of limiting control surface position comprising initially preventing the actuator torque delivered to said control surface from exceeding a first predetermined constant maximum and thereafter preventing the actuator torque delivered from exceeding a maximum which increases with time from said first maximum at least up to a second predetermined constant maximum.

10. In a servo system of the type including electromechanical actuator means for delivering torque to an aircraft control surface in response to an actuator means energizing signal $S_E$, and means for developing from input and feedback signals a signal $S_C$ indicative of a comparison therebetween, improved circuit means receiving $S_C$ and providing $S_E$ therefrom comprising means for initially preventing the actuator torque delivered to said control surface from exceeding a first predetermined constant maximum and thereafter preventing the actuator torque delivered from exceeding a maximum which increases with time from said first maximum at least up to a second predetermined constant maximum.

* * * * *

UNITED STATES PATENT AND TRADEMARK OFFICE
CERTIFICATE OF CORRECTION

PATENT NO. : 4,063,140
DATED : Dec. 13, 1977
INVENTOR(S) : Leo P. Kammerer; Gordon R. Fabian; Roger D. Burns It is certified that error appears in the above-identified patent and that said Letters Patent are hereby corrected as shown below:

IN THE SPECIFICATION:

Column 3, line 9, delete the equation,
$$"e_4=-C, \text{ for } e_3>0."$$
and substitute therefor
$$--e_4=-C, \text{ for } e_3<0.--.$$

Column 3, line 51, delete "$e_{oL}$" and substitute therefor --$i_{oL}$--.

Column 4, line 12, delete "$\delta A$" and substitute therefor --$\gamma A$--.

Signed and Sealed this

Second Day of May 1978

[SEAL]

Attest:

RUTH C. MASON
Attesting Officer

LUTRELLE F. PARKER
Acting Commissioner of Patents and Trademarks